United States Patent
Cheng et al.

(10) Patent No.: US 11,425,330 B2
(45) Date of Patent: Aug. 23, 2022

(54) PROJECTOR AND PROJECTION METHOD

(71) Applicant: QISDA CORPORATION, Taoyuan (TW)

(72) Inventors: Tsai-Hsu Cheng, New Taipei (TW); Chih-Wei Cho, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/209,134

(22) Filed: Mar. 22, 2021

(65) Prior Publication Data

US 2021/0306593 A1    Sep. 30, 2021

(30) Foreign Application Priority Data

Mar. 31, 2020    (CN) .......................... 202010242380.5

(51) Int. Cl.
  *H04N 7/01*    (2006.01)
  *H04N 9/31*    (2006.01)

(52) U.S. Cl.
  CPC .......... *H04N 7/013* (2013.01); *H04N 7/0125* (2013.01); *H04N 9/3179* (2013.01)

(58) Field of Classification Search
  CPC .... H04N 7/013; H04N 7/0125; H04N 9/3179; H04N 9/3105; H04N 9/3188; H04N 9/3114
  See application file for complete search history.

(56) References Cited

U.S. PATENT DOCUMENTS

| | | | | |
|---|---|---|---|---|
| 5,241,608 A | * | 8/1993 | Fogel | G06T 7/207 375/240.12 |
| 9,967,581 B2 | * | 5/2018 | Chung | H04N 19/132 |
| 10,574,937 B2 | * | 2/2020 | Geng | H04N 7/0125 |
| 2004/0071211 A1 | * | 4/2004 | Washino | H04N 7/0112 348/E7.003 |
| 2009/0201556 A1 | * | 8/2009 | Hara | H04N 1/32261 382/100 |
| 2010/0020210 A1 | * | 1/2010 | Tsunekawa | H04N 19/61 348/294 |
| 2010/0091181 A1 | * | 4/2010 | Capps | G09G 5/397 348/E7.003 |

(Continued)

FOREIGN PATENT DOCUMENTS

| | | | | |
|---|---|---|---|---|
| EP | 1650978 A1 | * | 4/2006 | .......... H04N 19/186 |
| EP | 1650978 B1 | * | 6/2010 | .......... H04N 19/186 |

*Primary Examiner* — Paulos M Natnael (57) ABSTRACT

A projector includes an image converting module, a processing module and an imaging module. The image converting module receives an original image sequence with a first frame rate. The image converting module inserts a plurality of supplement images into the original image sequence per second to output a supplement image sequence with a second frame rate, wherein the second frame rate is larger than the first frame rate. The processing module is coupled to the image converting module. The processing module receives the supplement image sequence from the image converting module. The processing module ignores the supplement images and processes and outputs the original image sequence. The imaging module is coupled to the processing module. The imaging module receives the original image sequence from the processing module and outputs the original image sequence by the first frame rate.

9 Claims, 6 Drawing Sheets

(56) References Cited

U.S. PATENT DOCUMENTS

| | | | |
|---|---|---|---|
| 2010/0302438 A1* | 12/2010 | Fujisawa | H04N 7/014 |
| | | | 348/E7.003 |
| 2011/0090309 A1* | 4/2011 | Suzuki | H04N 19/597 |
| | | | 348/51 |
| 2016/0366367 A1* | 12/2016 | Chen | G06T 7/0002 |
| 2017/0364729 A1* | 12/2017 | Kagaya | G06T 7/174 |
| 2018/0302592 A9* | 10/2018 | Geng | G11B 27/34 |
| 2020/0053273 A1* | 2/2020 | Kim | H04N 5/23218 |
| 2020/0275050 A1* | 8/2020 | Pytlarz | H04N 19/80 |
| 2020/0382723 A1* | 12/2020 | Pena | H04N 5/23267 |

\* cited by examiner

PROJECTOR AND PROJECTION METHOD

BACKGROUND OF THE INVENTION

1. Field of the Invention

The invention relates to a projector and a projection method and, more particularly, to a projector and a projection method adapted to high resolution and high image frame rate.

2. Description of the Prior Art

In general, projectors are classified into liquid crystal display (LCD) projector and digital light processing (DLP) projector. Since the DLP projector has advantages of high contrast, small size, high image sharpness, and so on, the DLP projector has been used widely. As a user has been paying more and more attention to image quality, resolution and image frame rate of the DLP projector have been improved correspondingly. At present, due to the limitation of hardware architecture, a DLP projector with high resolution (e.g. 4K) cannot support an image frame rate higher than 120 Hz, such that the DLP projector with high resolution is limited in use.

SUMMARY OF THE INVENTION

The invention provides a projector and a projection method adapted to high resolution and high image frame rate, so as to solve the aforesaid problems.

According to an embodiment of the invention, a projector comprises an image converting module, a processing module and an imaging module. The image converting module receives an original image sequence with a first frame rate. The image converting module inserts a plurality of supplement images into the original image sequence per second to output a supplement image sequence with a second frame rate, wherein the second frame rate is larger than the first frame rate. The processing module is coupled to the image converting module. The processing module receives the supplement image sequence from the image converting module. The processing module ignores the supplement images and processes and outputs the original image sequence. The imaging module is coupled to the processing module. The imaging module receives the original image sequence from the processing module and outputs the original image sequence by the first frame rate.

According to another embodiment of the invention, the projector may further comprise a light converting module. The light converting module is disposed with respect to the imaging module. The light converting module comprises a plurality of light converting groups and each light converting group comprises a plurality of light converting areas.

According to another embodiment of the invention, a projection method comprises steps of receiving an original image sequence with a first frame rate by an image converting module; inserting a plurality of supplement images into the original image sequence per second to output a supplement image sequence with a second frame rate by the image converting module, wherein the second frame rate is larger than the first frame rate; receiving the supplement image sequence from the image converting module by a processing module; ignoring the supplement images and processing and outputting the original image sequence by the processing module; receiving the original image sequence from the processing module by an imaging module; and outputting the original image sequence by the first frame rate by the imaging module.

As mentioned in the above, when the processing module cannot support the original image sequence with the first frame rate, the image converting module uses the supplement images to upconvert the original image sequence with the first frame rate into the supplement image sequence with the second frame rate supported by the processing module. After receiving the supplement image sequence, the processing module ignores the supplement images (i.e. neither processes nor outputs the supplement images) and only processes and outputs the original image sequence. Accordingly, the imaging module can output the original image sequence by the first frame rate. Since the input frame rate and the output frame rate of the original image sequence are kept the same (i.e. the input frame rate and the output frame rate of the original image sequence both are the first frame rate), the invention can improve the image output of the original image sequence with great smoothness. Furthermore, the light converting module (e.g. color wheel or phosphor wheel) of the projector is driven by a motor to rotate. The invention may further dispose a plurality of light converting groups on the light converting module, such that the light converting module is capable of outputting a plurality of images while rotating one circle. Therefore, when the first frame rate of the original image sequence is too high, the invention can utilize the light converting module with the light converting groups to reduce a rotation speed of the motor, so as to prevent the rotation speed of the motor from being too high to generate annoying high noise.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
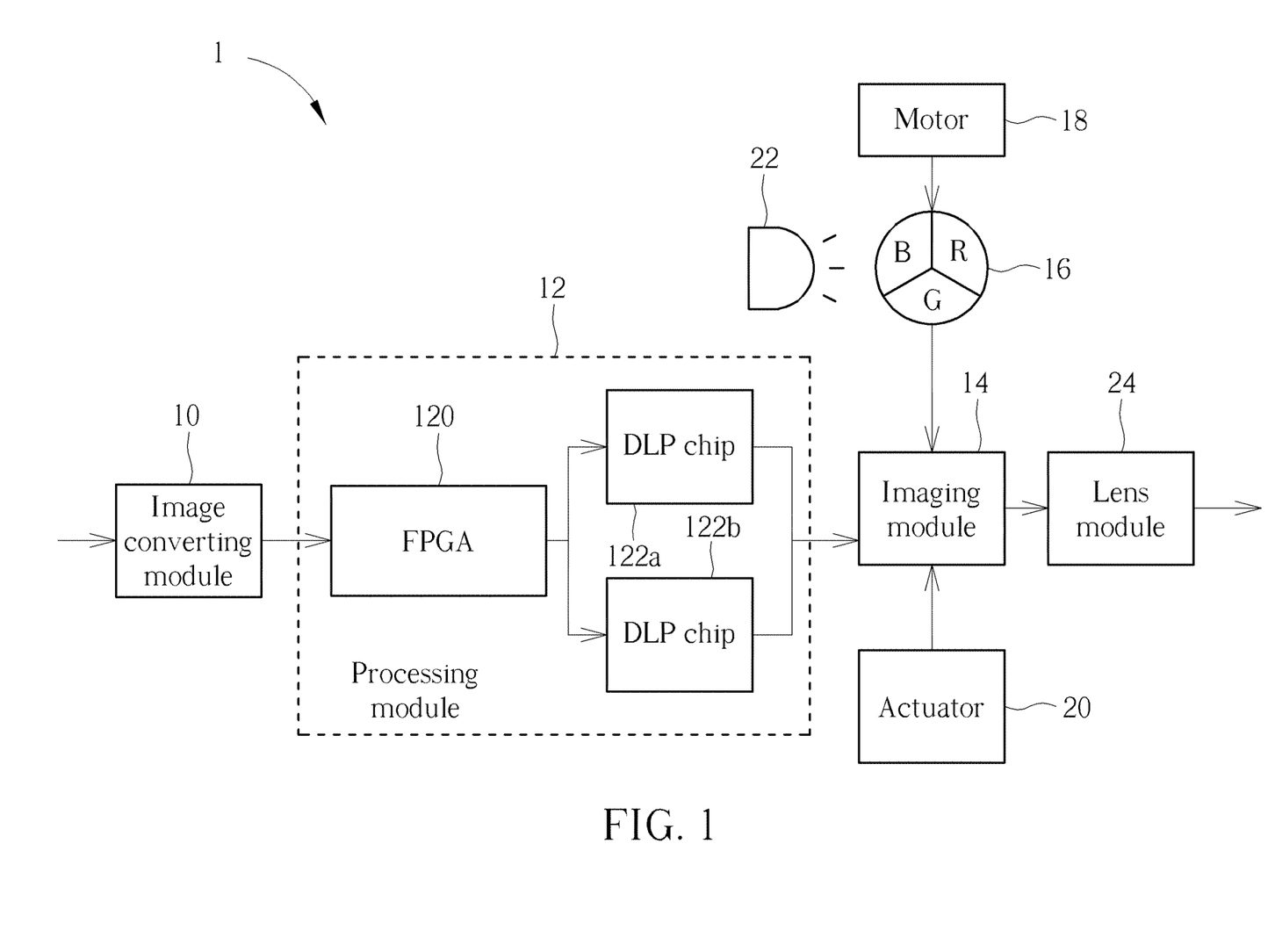
FIG. 1 is a functional block diagram illustrating a projector according to an embodiment of the invention.

Referring to FIG. 1, FIG. 1 is a functional block diagram illustrating a projector 1 according to an embodiment of the invention. As shown in FIG. 1, the projector 1 comprises an image converting module 10, a processing module 12, an imaging module 14, a light converting module 16, a motor 18, an actuator 20, a light source 22 and a lens module 24.

In general, the projector 1 may be further equipped with some necessary hardware or software components for specific purposes, such as input/output port, application, circuit board, power supply, communication module, etc., and it depends on practical applications.

In this embodiment, the image converting module 10 may be a scaler. The processing module 12 is coupled to the image converting module 10. In this embodiment, the processing module 12 may comprise a field programmable gate array (FPGA) 120 and two digital light processing (DLP) chips 122a, 122b. The imaging module 14 is coupled to the processing module 12. In this embodiment, the imaging module 14 may be a digital micromirror device (DMD). The light converting module 16 is disposed with respect to the imaging module 14 and the light source 22 is disposed with respect to the light converting module 16. In this embodiment, the light source 22 may be a mercury lamp or other light emitting components and the light converting module 16 may be a color wheel. In this embodiment, the light converting module 16 may comprise three light converting areas R, G, B, but is not so limited. The configuration of the light converting areas of the light converting module 16 may be determined according to practical applications. In practical applications, the light converting areas R, G, B may be red, green and blue filters. The motor 18 is coupled to the light converting module 16 and configured to drive the light converting module 16 to rotate. The actuator 20 is coupled to the imaging module 14 and configured to drive the imaging module 14 to move. The lens module 24 is disposed with respect to the imaging module 14 and configured to project the light from the imaging module 14 to form an image. It should be noted that the imaging principle of the projector 1 is well known by one skilled in the art, so the explanation will not be depicted herein.

In this embodiment, the projector 1 is a DLP projector with high resolution (e.g. 4K). The image converting module 10 is configured to receive external input images and transmit the images to the FPGA 120. Then, the FPGA 120 divides each image into a plurality of sub-images (e.g. two or four) and then divides each sub-image into a left half-image and a right half-image. Then, the FPGA 120 transmits the left half-image and the right half-image to the DLP chips 122a, 122b, respectively. The DLP chips 122a, 122b process the left half-image and the right half-image, respectively, and then transmit all pixels of the left half-image and the right half-image to the imaging module 14. If a native resolution of the imaging module 14 is 2712*1528 or 1920*1080 rather than 3840*2160, the projector 1 needs to move the imaging module 14 by the actuator 20 according to each sub-image, so as to generate an image with 4K resolution. It should be noted that the aforesaid image processing process may be implemented by expanded pixel resolution (XPR) technology, wherein the XPR technology is well known by one skilled in the art, so the explanation will not be depicted herein.

For different image frame rates, the FPGA 120, the actuator 20 and the motor 18 may have some limitations, as shown in table 1 below. It should be noted that table 1 just shows some image frame rates usually used so far and the invention is not so limited.

TABLE 1

| Image frame rate | 100 Hz/ 120 Hz | 144 Hz | 165 Hz | 200 Hz/ 240 Hz |
|---|---|---|---|---|
| FPGA 120/ Actuator 20 | Support | Not support | Not support | Support |
| Motor 18 | Support, low noise | Support, low noise | Hard to support, High noise | Hard to support, High noise |

As shown in table 1, the FPGA 120 and the actuator 20 cannot support the image frame rates of 144 Hz and 165 Hz. Furthermore, when the image frame rate is higher than 165 Hz, the motor 18 is hard to support the image frame rate and generates annoying high noise.

In the following, the image frame rate of 144 Hz is used first to depict the technical feature of the invention.

When the projector 1 of the invention is operating, the image converting module 10 receives an original image sequence with a first frame rate first. Then, the image converting module 10 inserts a plurality of supplement images into the original image sequence per second to output a supplement image sequence with a second frame rate, wherein the second frame rate is larger than the first frame rate. In this embodiment, it is assumed that the first frame rate is 144 Hz. Since the FPGA 120 cannot support the image frame rate of 144 Hz, the image converting module 10 may insert 56 supplement images into the original image sequence per second to output the supplement image sequence with the second frame rate of 200 Hz. In this embodiment, the image converting module 10 may insert the supplement images into the original image sequence sequentially and averagely. Accordingly, the image converting module 10 may upconvert the original image sequence with the first frame rate 144 Hz into the supplement image sequence with the second frame rate 200 Hz supported by the FPGA 120.

Then, the FPGA 120 of the processing module 12 receives the supplement image sequence from the image converting module 10, wherein the FPGA 120 processes the supplement image sequence according to the aforesaid manner and then transmits the supplement image sequence to the DLP chips 122a, 122b. Then, the DLP chips 122a, 122b of the processing module 12 ignore the supplement images (i.e. neither process nor output the supplement images) and process and output the original image sequence.

Figure 2:
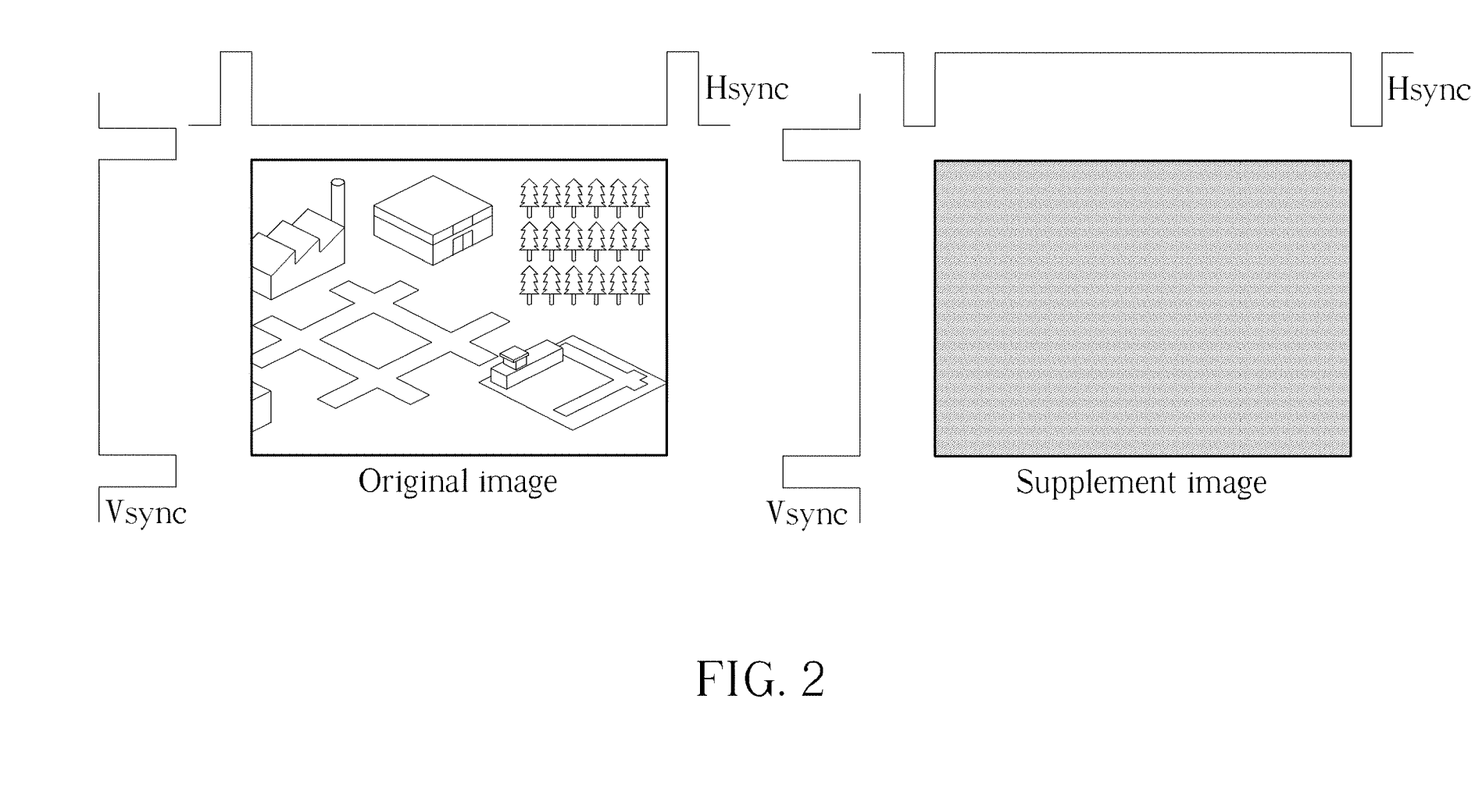
FIG. 2 is a schematic diagram illustrating one single original image and one single supplement image of the original image sequence.

Referring to FIG. 2, FIG. 2 is a schematic diagram illustrating one single original image and one single supplement image of the original image sequence. As shown in FIG. 2, a synchronization signal of each original image of the original image sequence may have a first polarity. Furthermore, after generating the supplement images, the image converting module 10 may set another synchronization signal of each supplement image to be a second polarity, wherein the second polarity is different from the first polarity. In this embodiment, the second polarity is opposite to the first polarity. Still further, the aforesaid synchronization signal may be a horizontal synchronization signal Hsync, a vertical synchronization signal Vsync, or a combination thereof according to practical applications. Therefore, the DLP chips 122a, 122b of the processing module 12 may recognize the supplement images from the supplement image sequence according to the first polarity and the second polarity of the synchronization signals. After recognizing the supplement images, the DLP chips 122a, 122b ignore the supplement images (i.e. neither process nor output the supplement images) and only process and output the original image sequence. Accordingly, the DLP chips 122a, 122b can downconvert the second frame rate 200 Hz of the supplement image sequence into the first frame rate 144 Hz of the original image sequence.

Moreover, the supplement images may comprise at least one predetermined image and each predetermined image may have a predetermined pattern. For example, the image converting module 10 may generate the supplement images by white pattern and black pattern, wherein the aforesaid predetermined pattern may be black pattern. Accordingly, the supplement image with black pattern is the aforesaid predetermined image. In this embodiment, an output order of each supplement image in the supplement image sequence corresponds to a weight, wherein the weight may be represented by the power of 2, as shown in table 2 below.

TABLE 2

| Weight | Supplement image |
| --- | --- |
| $2^0$ | $1^{st}$ supplement image (White pattern) |
| $2^1$ | $2^{nd}$ supplement image (White pattern) |
| $2^2$ | $3^{rd}$ supplement image (White pattern) |
| $2^3$ | $4^{th}$ supplement image (Predetermined image with black pattern) |
| $2^4$ | $5^{th}$ supplement image (Predetermined image with black pattern) |
| $2^5$ | $6^{th}$ supplement image (Predetermined image with black pattern) |
| ... | ... |
| $2^n$, n = 6-55 | $7^{th}$ to $56^{th}$ supplement images (White pattern) |

Thus, the DLP chips 122a, 122b of the processing module 12 may recognize the at least one predetermined image from the supplement image sequence according to the aforesaid second polarity and predetermined pattern and obtain a number of the supplement images according to the weight of the at least one predetermined image. As shown in table 2, the DLP chips 122a, 122b may recognize three predetermined images from the supplement image sequence (i.e. the fourth to sixth supplement images in the supplement image sequence) according to the aforesaid second polarity and predetermined pattern (i.e. black pattern). Then, the DLP chips 122a, 122b may obtain the number of the supplement images according to the weights of the fourth to sixth supplement images (i.e. $2^3+2^4+2^5=56$).

In this embodiment, the DLP chip 122a of the processing module 12 may be set as a main processing chip. Thus, after obtaining the number of the supplement images, the DLP chip 122a of the processing module 12 may set an output frame rate of the imaging module 14 to be the first frame rate according to the second frame rate of the supplement image sequence and the number of the supplement images (i.e. $200-(2^3+2^4+2^5)=144$ Hz). Therefore, when the imaging module 14 receives the original image sequence from the DLP chips 122a, 122b of the processing module 12, the imaging module 14 will output the original image sequence by the first frame rate 144 Hz. Furthermore, the DLP chip 122a may set a rotation speed of the motor 18 to be 1× speed, so as to prevent the rotation speed of the motor 18 from being too high. Since the input frame rate and the output frame rate of the original image sequence are kept the same (i.e. the input frame rate and the output frame rate of the original image sequence both are the first frame rate), the invention can improve the image output of the original image sequence with great smoothness. Similarly, when the input frame rate of the original image sequence (i.e. the first frame rate) is between 100 Hz and 150 Hz, the invention may keep the input frame rate and the output frame rate of the original image sequence the same by the aforesaid manner.

In another embodiment, the image converting module 10 may inserts 96 supplement images into the original image sequence per second to output the supplement image sequence with the second frame rate of 240 Hz. At this time, the relationship between the output order of the supplement image and the weight is shown in table 3 below.

TABLE 3

| Weight | Supplement image |
| --- | --- |
| $2^0$ | $1^{st}$ supplement image (White pattern) |
| $2^1$ | $2^{nd}$ supplement image (White pattern) |
| $2^2$ | $3^{rd}$ supplement image (White pattern) |
| $2^3$ | $4^{th}$ supplement image (White pattern) |
| $2^4$ | $5^{th}$ supplement image (White pattern) |
| $2^5$ | $6^{th}$ supplement image (Predetermined image with black pattern) |
| $2^6$ | $7^{th}$ supplement image (Predetermined image with black pattern) |
| ... | ... |
| $2^n$, n = 7-95 | $8^{th}$ to $96^{th}$ supplement images (White pattern) |

Thus, as shown in table 3, the DLP chips 122a, 122b may recognize two predetermined images from the supplement image sequence (i.e. the sixth to seventh supplement images in the supplement image sequence) according to the aforesaid second polarity and predetermined pattern (i.e. black pattern). Then, the DLP chips 122a, 122b may obtain the number of the supplement images according to the weights of the sixth to seventh supplement images (i.e. $2^5+2^6=96$). After obtaining the number of the supplement images, the DLP chip 122a of the processing module 12 may set the output frame rate of the imaging module 14 to be the first frame rate according to the second frame rate of the supplement image sequence and the number of the supplement images (i.e. $240-(2^5+2^6)=144$ Hz).

For further explanation, since the supplement images are generated by the image converting module 10, the image converting module 10 has known the number of the supplement images. Accordingly, the image converting module 10 may arrange the output order of the supplement image with the predetermined pattern (i.e. the aforesaid predetermined image) according to the number of the supplement images and the corresponding weights. Therefore, the processing module 12 can recognize the predetermined image from the supplement image sequence according to the aforesaid second polarity and predetermined pattern and obtains the number of the supplement images according to the weight of the predetermined image.

In another embodiment, the DLP chips 122a, 122b of the processing module 12 may also recognize all of the supplement images from the supplement image sequence according to the aforesaid second polarity to obtain the number of the supplement images. Then, the DLP chip 122a of the processing module 12 sets the output frame rate of the imaging module 14 to be the first frame rate according to the second frame rate and the number of the supplement images. Accordingly, the image converting module 10 does not need to set the aforesaid predetermined image and weight while generating the supplement images.

In another embodiment, the image converting module 10 may communicate with the DLP chip 122a of the processing module 12 through a circuit. Therefore, after receiving the original image sequence, the image converting module 10 may directly transmit the information of the first frame rate of the original image sequence to the DLP chip 122a of the processing module 12. At this time, the DLP chip 122a of the processing module 12 may set the output frame rate of the imaging module 14 to be the first frame rate. Accordingly, the image converting module 10 does not need to set the aforesaid predetermined image and weight while generating the supplement images.

Figure 3:
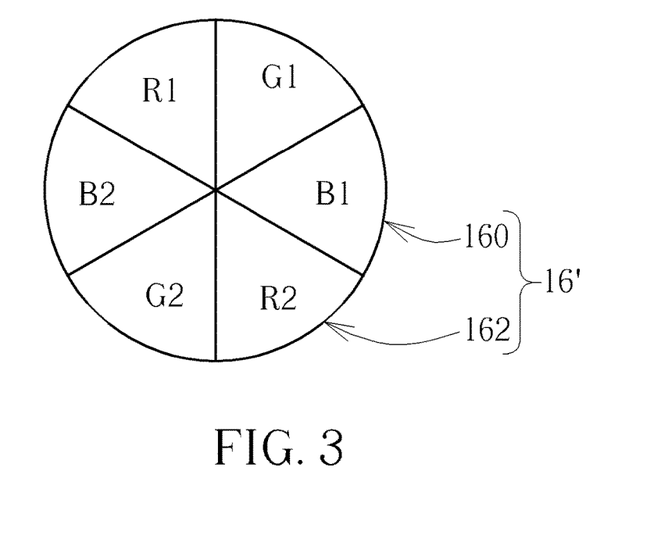
FIG. 3 is a schematic diagram illustrating a light converting module according to another embodiment of the invention.
Figure 4:
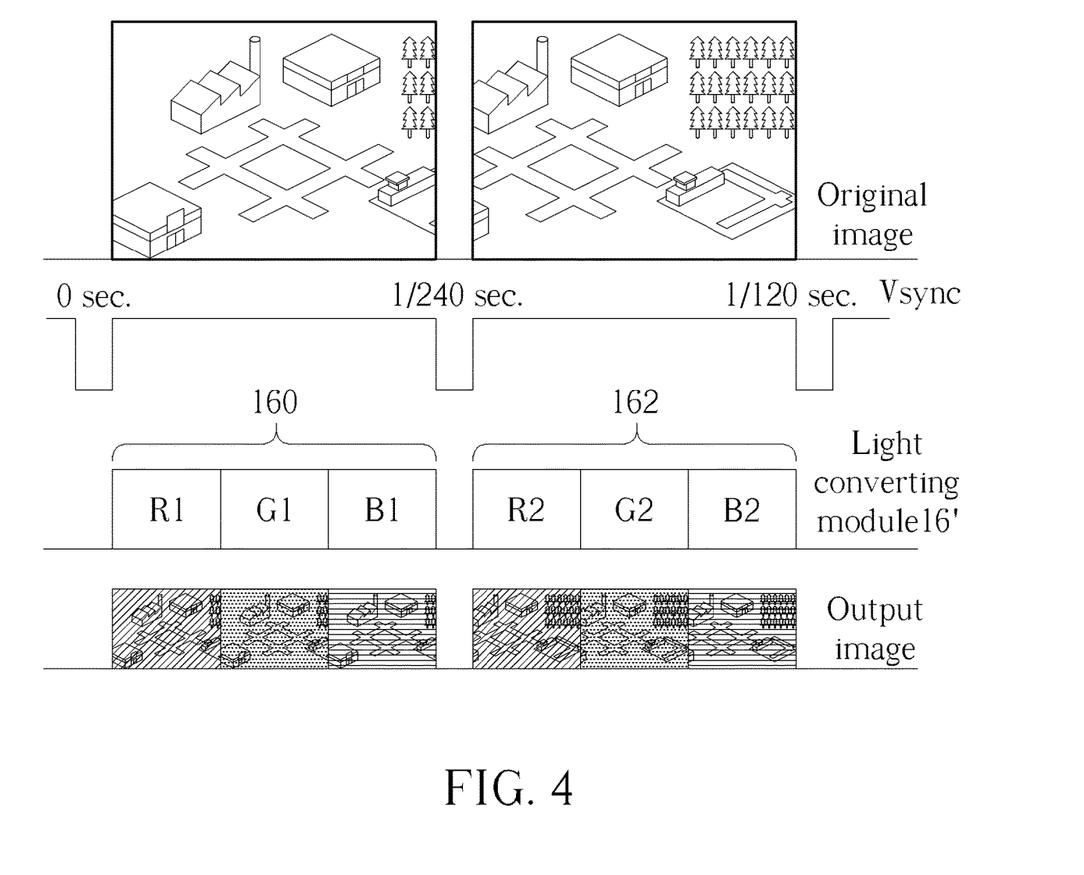
FIG. 4 is a schematic diagram illustrating images outputted by the light converting module shown in FIG. 3.

Referring to FIGS. 3 and 4, FIG. 3 is a schematic diagram illustrating a light converting module 16' according to another embodiment of the invention and FIG. 4 is a schematic diagram illustrating images outputted by the light converting module 16' shown in FIG. 3.

In another embodiment, when the input frame rate of the original image sequence (i.e. the first frame rate) is 200 Hz or 240 Hz, an output frequency of the motor 18 cannot be set lower than 200 Hz or 240 Hz even though the rotation speed of the motor 18 is set to 1× speed. Therefore, as shown in FIG. 3, the light converting module 16' of the invention may comprise a plurality of light converting groups and each light converting group comprises a plurality of light converting areas. In this embodiment, the light converting module 16' may comprise two light converting groups 160, 162, wherein the light converting group 160 may comprise three light converting areas R1, G1, B1 and the light converting group 162 may comprise three light converting areas R2, G2, B2.

The light converting module 16 shown in FIG. 1 may be replaced by the light converting module 16' shown in FIG. 3. When the motor 18 drives the light converting module 16' to rotate one circle, the two light converting groups 160, 162 of the light converting module 16' may output two images, as shown in FIG. 4. Accordingly, when the input frame rate of the original image sequence (i.e. the first frame rate) is 240 Hz, the output frequency of the motor 18 may be reduced to 120 Hz, so as to prevent the rotation speed of the motor 18 from being too high to generate annoying high noise. It should be noted that the number of the light converting groups of the light converting module 16' may be determined according to the required image frame rate.

In another embodiment, when the input frame rate of the original image sequence (i.e. the first frame rate) is higher than 150 Hz and lower than 200 Hz, the invention may utilize the supplement images and the light converting module with a plurality of light converting groups simultaneously to overcome the limitation of hardware architecture. For example, when the input frame rate of the original image sequence (i.e. the first frame rate) is Y Hz (150<Y<200), the image converting module 10 may upconvert the input frame rate of the original image sequence (i.e. the first frame rate) into 200 Hz according to the aforesaid manner. Furthermore, the DLP chips 122a, 122b may also downconvert 200 Hz into Y Hz according to the aforesaid manner. In this embodiment, the aforesaid light converting module may comprise three light converting groups. Thus, when the motor 18 drives the light converting module to rotate one circle, the three light converting groups of the light converting module may output three images. At this time, the rotation speed of the motor 18 may be set to ⅔×speed, such that the rotation speed of the light converting module is between 100 Hz and 133 Hz. Similarly, if the input frame rate of the original image sequence (i.e. the first frame rate) is higher than 200 Hz and lower than 240 Hz, the light converting module of the invention may comprise two light converting groups and the rotation speed of the motor 18 may be set to ½×speed. At this time, the rotation speed of the light converting module is between 100 Hz and 120 Hz.

Figure 5:
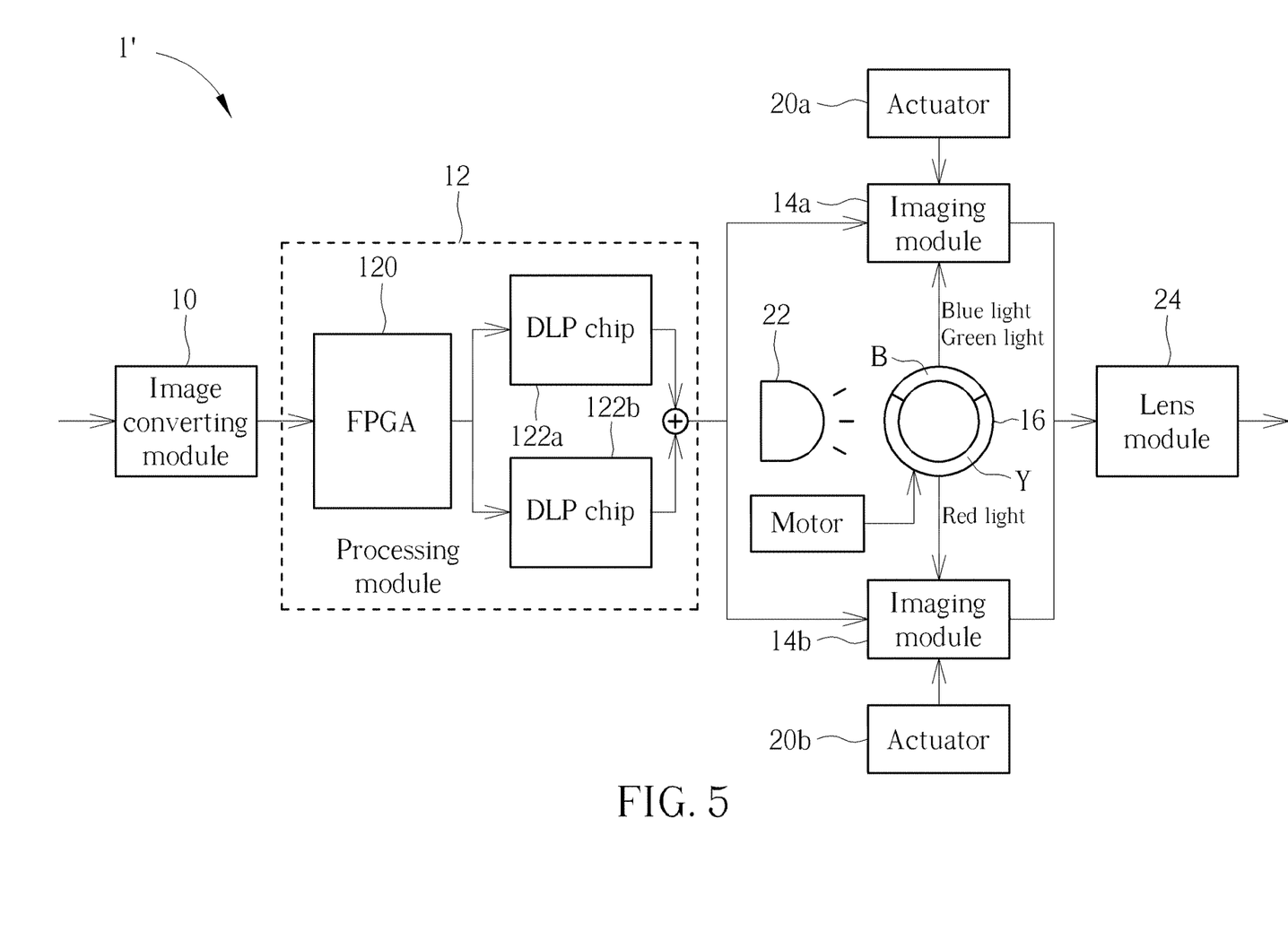
FIG. 5 is a functional block diagram illustrating a projector according to another embodiment of the invention.

Referring to FIG. 5, FIG. 5 is a functional block diagram illustrating a projector 1' according to another embodiment of the invention. The main difference between the projector 1' and the aforesaid projector 1 is that the light source 22 of the projector 1' may be a laser and the light converting module 16 of the projector 1' may be a phosphor wheel. In this embodiment, the light converting module 16 may comprise two light converting areas B, Y, but is not so limited. The configuration of the light converting areas of the light converting module 16 may be determined according to practical applications. In practical applications, the light converting area B may directly reflect light emitted by a blue light source and the light converting area Y may have yellow phosphor formed thereon. Furthermore, the projector 1' comprises two imaging modules 14a, 14b and two actuators 20a, 20b. The actuators 20a, 20b are coupled to the imaging modules 14a, 14b, respectively, and configured to drive the imaging modules 14a, 14b to move. It should be noted that the same elements in FIG. 5 and FIG. 1 are represented by the same numerals, so the repeated explanation will not be depicted herein again.

Still further, the projector 1' may be further equipped with at least one dichroic component and at least one reflecting mirror (not shown), such that blue light and green light may be transmitted to the imaging module 14a and red light may be transmitted to the imaging module 14b. It should be noted that the principles of the dichroic component and the reflecting mirror are well known by one skilled in the art, so the explanation will not be depicted herein. The principle of the projector 1 mentioned in the above can also be applied to the projector 1', so the explanation will not be depicted herein either.

Figure 6:
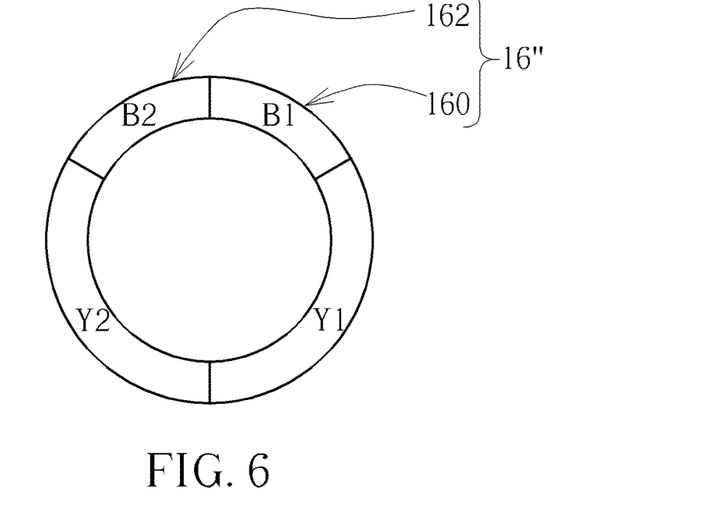
FIG. 6 is a schematic diagram illustrating a light converting module according to another embodiment of the invention.
Figure 7:
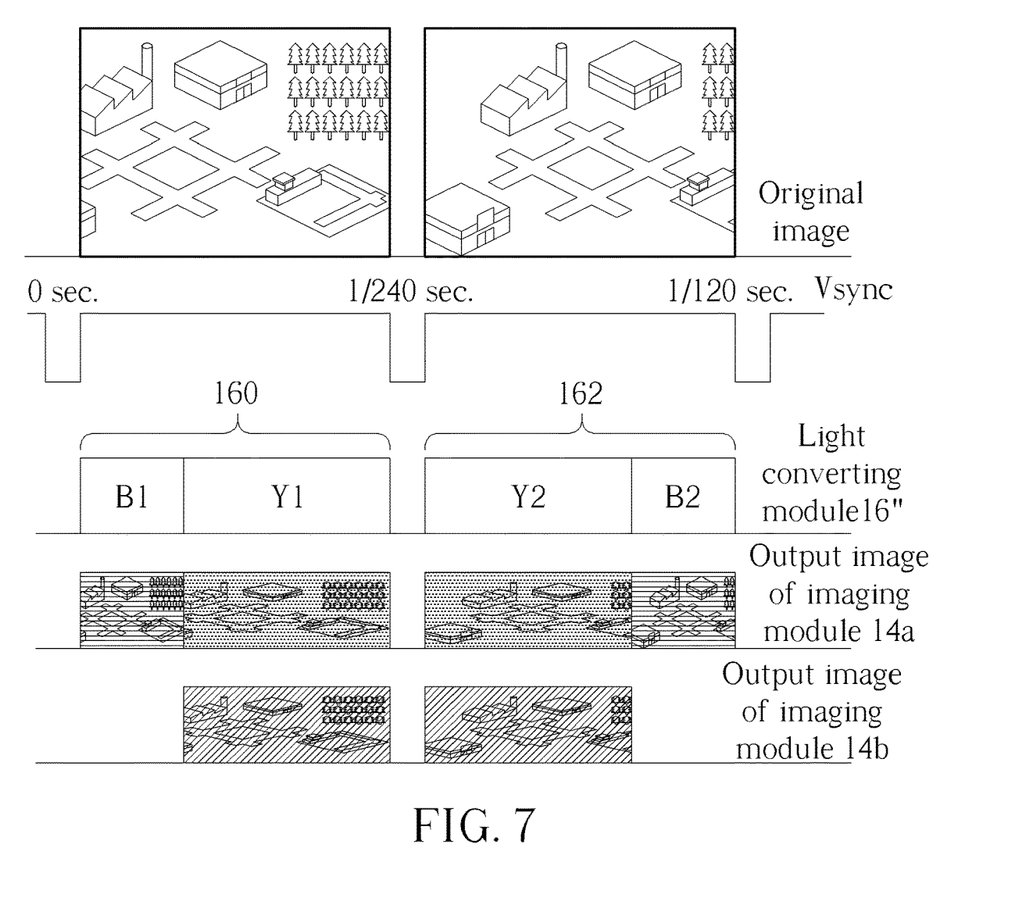
FIG. 7 is a schematic diagram illustrating images outputted by the light converting module shown in FIG. 6.

Referring to FIGS. 6 and 7, FIG. 6 is a schematic diagram illustrating a light converting module 16" according to another embodiment of the invention and FIG. 7 is a schematic diagram illustrating images outputted by the light converting module 16" shown in FIG. 6.

As shown in FIG. 6, the light converting module 16" may comprise two light converting groups 160, 162, wherein the light converting group 160 may comprise two light converting areas B1, Y1 and the light converting group 162 may comprise two light converting areas B2, Y2. The light converting module 16 shown in FIG. 5 may be replaced by the light converting module 16" shown in FIG. 6. When the motor 18 drives the light converting module 16" to rotate one circle, the two light converting groups 160, 162 of the light converting module 16" may output two images, as shown in FIG. 7. Accordingly, when the input frame rate of the original image sequence (i.e. the first frame rate) is 240 Hz, the output frequency of the motor 18 may be reduced to 120 Hz, so as to prevent the rotation speed of the motor 18 from being too high to generate annoying high noise. It should be noted that the number of the light converting groups of the light converting module 16" may be determined according to the required image frame rate.

Figure 8:
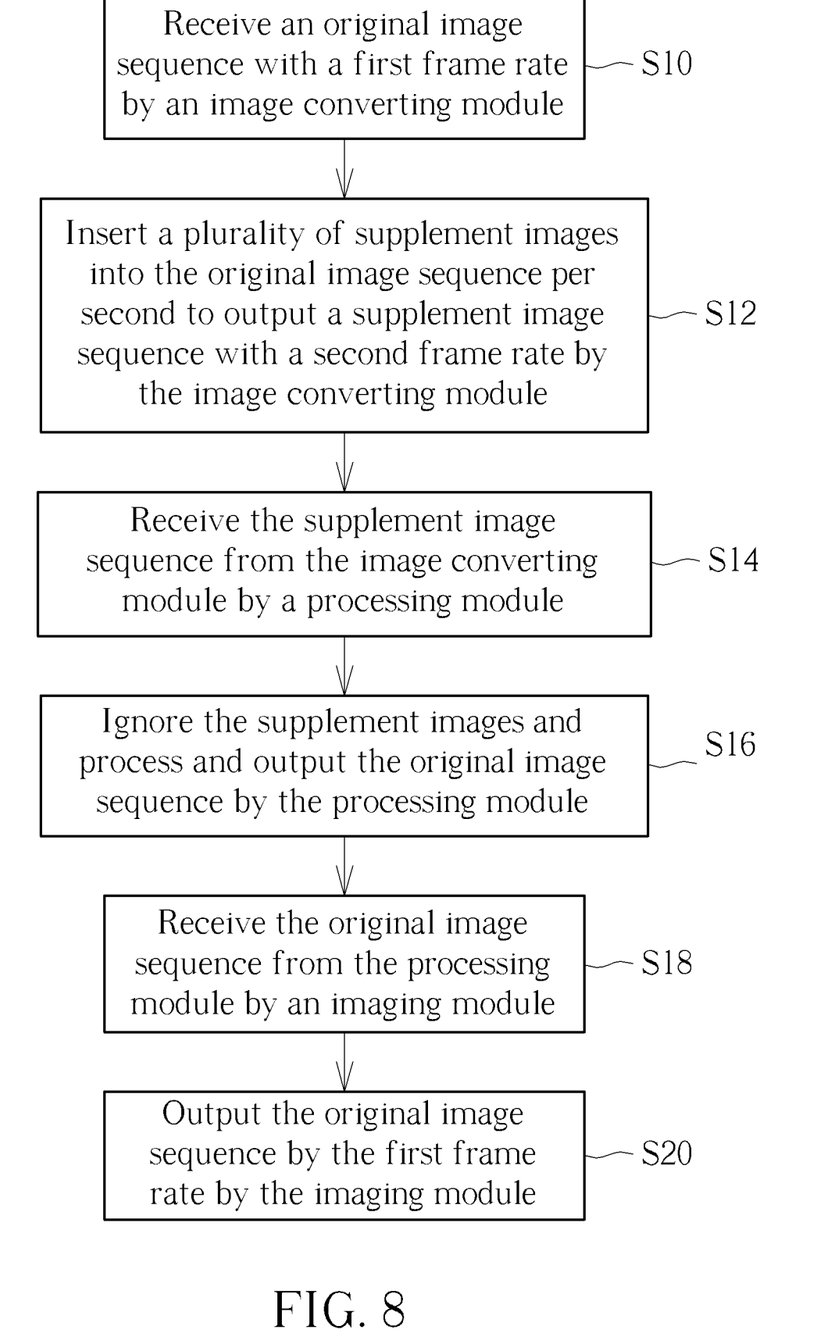
FIG. 8 is a flowchart illustrating a projection method according to an embodiment of the invention.

Referring to FIG. 8, FIG. 8 is a flowchart illustrating a projection method according to an embodiment of the invention. The projection method shown in FIG. 8 is adapted to the projector 1 shown in FIG. 1 and the projector 1' shown in FIG. 5. First, step S10 is performed to receive an original image sequence with a first frame rate by an image converting module 10. Then, step S12 is performed to insert a plurality of supplement images into the original image sequence per second to output a supplement image sequence with a second frame rate by the image converting module 10. Then, step S14 is performed to receive the supplement image sequence from the image converting module 10 by a processing module 12. Then, step S16 is performed to ignore the supplement images and process and output the original image sequence by the processing module 12. Then, step S18 is performed to receive the original image sequence from the processing module 12 by an imaging module 14. Then, step S20 is performed to output the original image sequence by the first frame rate by the imaging module 14.

It should be noted that the detailed embodiments of the projection method of the invention are mentioned in the above and those will not be depicted herein again. Furthermore, each part or function of the control logic of the projection method of the invention may be implemented by a combination of software and hardware.

As mentioned in the above, when the processing module cannot support the original image sequence with the first frame rate, the image converting module uses the supplement images to upconvert the original image sequence with the first frame rate into the supplement image sequence with the second frame rate supported by the processing module. After receiving the supplement image sequence, the processing module ignores the supplement images (i.e. neither processes nor outputs the supplement images) and only processes and outputs the original image sequence. Accordingly, the imaging module can output the original image sequence by the first frame rate. Since the input frame rate and the output frame rate of the original image sequence are kept the same (i.e. the input frame rate and the output frame rate of the original image sequence both are the first frame rate), the invention can improve the image output of the original image sequence with great smoothness. Furthermore, the light converting module (e.g. color wheel or phosphor wheel) of the projector is driven by a motor to rotate. The invention may further dispose a plurality of light converting groups on the light converting module, such that the light converting module is capable of outputting a plurality of images while rotating one circle. Therefore, when the first frame rate of the original image sequence is too high, the invention can utilize the light converting module with the light converting groups to reduce a rotation speed of the motor, so as to prevent the rotation speed of the motor from being too high to generate annoying high noise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
    an image converting module receiving an original image sequence with a first frame rate, the image converting module inserting a plurality of supplement images into the original image sequence per second to output a supplement image sequence comprising the original image sequence and the supplement images with a second frame rate, the second frame rate being larger than the first frame rate;
    a processing module coupled to the image converting module, the processing module receiving the supplement image sequence comprising the original image sequence and the supplement images from the image converting module, the processing module ignoring the supplement images and processing and outputting the original image sequence; and
    an imaging module coupled to the processing module, the imaging module receiving the original image sequence from the processing module and outputting the original image sequence by the first frame rate.

2. The projector of claim 1, wherein a synchronization signal of the original image sequence has a first polarity, the image converting module sets another synchronization signal of the supplement images to be a second polarity, the second polarity is different from the first polarity, the supplement images comprise at least one predetermined image, each predetermined image has a predetermined pattern, an output order of each supplement image in the supplement image sequence corresponds to a weight, the processing module recognizes the at least one predetermined image from the supplement image sequence according to the second polarity and the predetermined pattern and obtains a number of the supplement images according to the weight of the at least one predetermined image, and the processing module sets an output frame rate of the imaging module to be the first frame rate according to the second frame rate and the number of the supplement images.

3. The projector of claim 1, wherein a synchronization signal of the original image sequence has a first polarity, the image converting module sets another synchronization signal of the supplement images to be a second polarity, the second polarity is different from the first polarity, the processing module recognizes the supplement images from the supplement image sequence according to the second polarity to obtain a number of the supplement images, and the processing module sets an output frame rate of the imaging module to be the first frame rate according to the second frame rate and the number of the supplement images.

4. The projector of claim 1, wherein the image converting module informs the processing module of the first frame rate of the original image sequence after receiving the original image sequence and the processing module sets an output frame rate of the imaging module to be the first frame rate.

5. The projector of claim 1, further comprising a light converting module disposed with respect to the imaging module, wherein the light converting module comprises a plurality of light converting groups and each light converting group comprises a plurality of light converting areas.

6. A projection method comprising:
    receiving an original image sequence with a first frame rate by an image converting module;
    inserting a plurality of supplement images into the original image sequence per second to output a supplement image sequence comprising the original image sequence and the supplement images with a second frame rate by the image converting module, wherein the second frame rate is larger than the first frame rate;
    receiving the supplement image sequence comprising the original image sequence and the supplement images from the image converting module by a processing module;
    ignoring the supplement images and processing and outputting the original image sequence by the processing module;
    receiving the original image sequence from the processing module by an imaging module; and
    outputting the original image sequence by the first frame rate by the imaging module.

7. The projection method of claim 6, wherein a synchronization signal of the original image sequence has a first polarity, the image converting module sets another synchronization signal of the supplement images to be a second polarity, the second polarity is different from the first polarity, the supplement images comprise at least one predetermined image, each predetermined image has a predetermined pattern, an output order of each supplement image in the supplement image sequence corresponds to a weight, the projection method further comprises:
- recognizing the at least one predetermined image from the supplement image sequence according to the second polarity and the predetermined pattern by the processing module;
- obtaining a number of the supplement images according to the weight of the at least one predetermined image by the processing module; and
- setting an output frame rate of the imaging module to be the first frame rate according to the second frame rate and the number of the supplement images by the processing module.

8. The projection method of claim 6, wherein a synchronization signal of the original image sequence has a first polarity, the image converting module sets another synchronization signal of the supplement images to be a second polarity, the second polarity is different from the first polarity, the projection method further comprises:
- recognizing the supplement images from the supplement image sequence according to the second polarity to obtain a number of the supplement images by the processing module; and
- setting an output frame rate of the imaging module to be the first frame rate according to the second frame rate and the number of the supplement images by the processing module.

9. The projection method of claim 6, further comprising:
- informing the processing module of the first frame rate of the original image sequence by the image converting module after receiving the original image sequence; and
- setting an output frame rate of the imaging module to be the first frame rate by the processing module.

* * * * *